INVENTOR
HARRY W. DIETERT

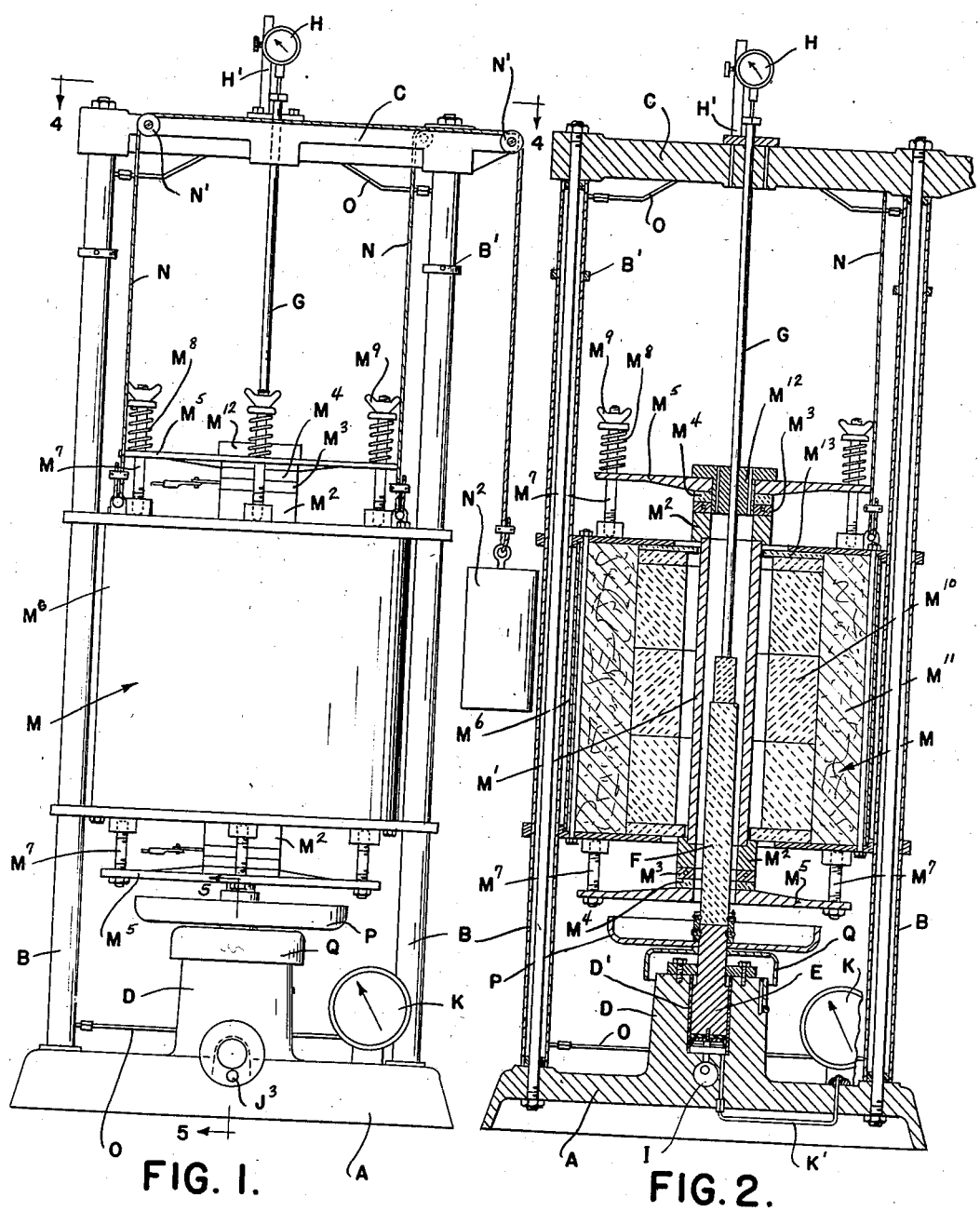

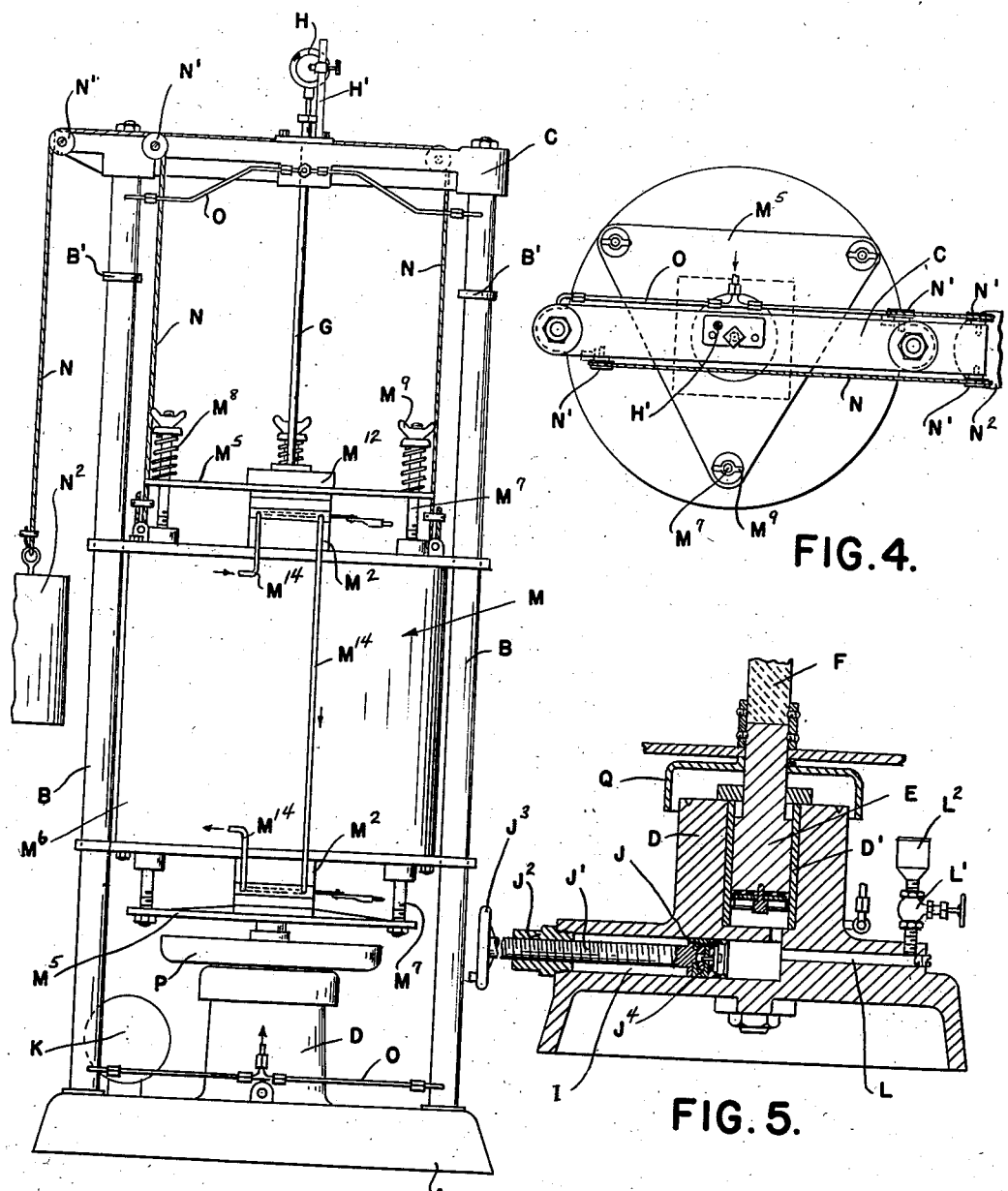

Patented Apr. 14, 1942

2,279,368

UNITED STATES PATENT OFFICE 2,279,368

DILATOMETER

Harry W. Dietert, Detroit, Mich.

Application July 5, 1938, Serial No. 217,539

11 Claims. (Cl. 73—51)

The invention relates to dilatometers and has more particular reference to an instrument designed for use in testing molded sand under conditions similar to those to which it is subjected when in contact with molten metal. Among the various tests which it is desirable to make are: first the strictly dilatometric test or change in volume due to increase of temperature; second the structural strength of the sample at a predetermined elevated temperature. These tests are important for if the strength of the mold is too great, and particularly a portion thereof which is surrounded by molten metal, then there is danger of cracking the casting as it shrinks in cooling. On the other hand, if the strength of the mold is insufficient, the molten metal may errode the mold face causing casting defects, such as dirt inclusion, washes and cuts. Tests of the physical strength of the cold mold will not accurately determine the strength of the structure under actual conditions in use and, therefore, it is necessary to simulate such conditions as closely as possible. One condition is that of shock due to sudden rise in temperature when the molten metal is first introduced. There is also the condition of more gradual change in temperature due to conduction of heat from the mold surface to the interior of the mold wall.

It is the object of the invention to facilitate the making of the tests above referred to, as well as others which are desirable, and to this end the invention consists in the construction as hereinafter set forth.

In the drawings:

Figure 1 is a front elevation of the instrument;

Figure 2 is a vertical central section therethrough;

Figure 3 is a rear elevation;

Figure 4 is a top plan view;

Figure 5 is a vertical section on line 5—5 of Figure 1;

Figures 6, 7:
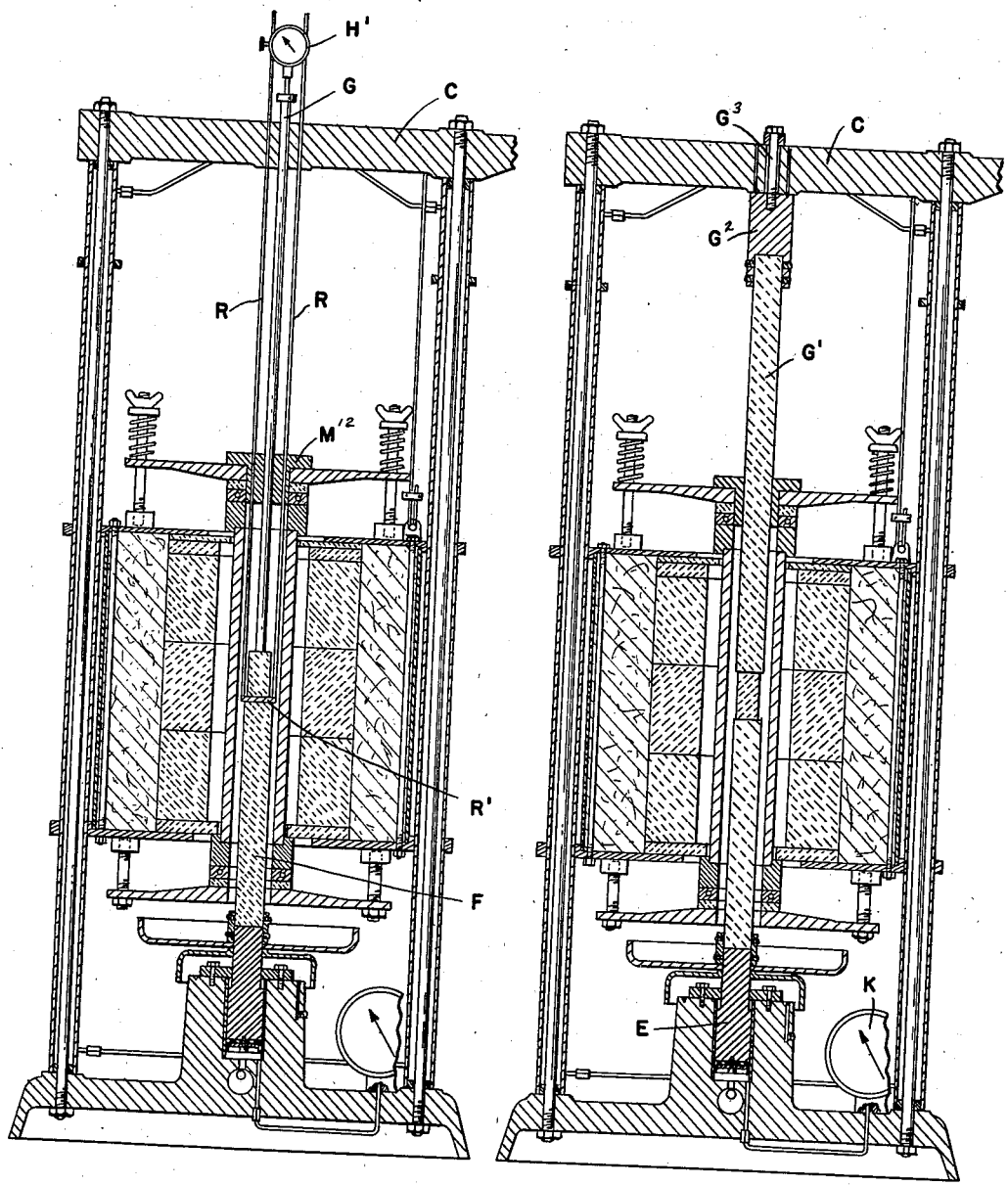
Figure 6 is a view similar to Figure 2 showing a modified construction.
Figure 7 is a similar view showing another modification.

My improved instrument comprises essentially spaced abutments between which a sample to be tested is placed, a heater for the sample so positioned and one or more gauges for measuring changes which take place in the sample due to rise in temperature. For convenience in manipulation the heater is preferably of tubular form and is so mounted as to be shiftable from a position removed from the sample to a position surrounding the same. This, as specifically shown, is accomplished by the use of an electrical furnace having an open ended tubular resistor and a surrounding heat insulating casing. The furnace is slidably mounted on a vertical frame and is counterweighted to facilitate vertical adjustment. The abutments between which the sample is placed are preferably formed of refractory rods, such for instance as quartz rods, having a relatively low coefficient of expansion. These rods are aligned with the axis of the tubular resistor and extend respectively to the bottom and top of the frame where they are operatively connected to the gauges. There is also provision for varying the pressure of the abutments against the sample, this being preferably by hydraulic means.

In detail, A is the base of the frame from which rises a pair of columns B preferably tubular and connected at their upper ends by a cross head C. Centrally of the base is a post D forming a hydraulic cylinder with a piston E therein. The upper end of the piston E has connected thereto the refractory rod F which forms one of the abutments. The cooperating refractory rod G is axially aligned with the rod F and is slidably mounted in a central bearing in the cross head C. Rod G is of sufficient weight to be maintained by gravity in contact with the specimen in the device. Above this cross head is a gauge H shown in Figures 1 to 3 as mounted on a standard H' rising from the cross head C. This gauge is for indicating the linear movement of the rod G due to expansion in the sample under test. The hydraulic cylinder in the post D is formed by a liner D' and the lower end of this cylinder is connected with a transverse bore I containing a piston J which is operated by a screw threaded rod J' passing outward through a correspondingly threaded bearing $J^2$ and having an operating handle $J^3$. This permits of placing any desired hydraulic pressure on the piston E which is measured by a gauge K connected to the cylinder by a conduit K'. There is also a cross passage L connected with a valve L' and filler cup $L^2$ through which hydraulic fluid may be introduced into the cylinders.

The furnace or heater M comprises a tubular resistor M' of any suitable material. The opposite ends of this resistor are connected to annular conductor heads $M^2$ preferably formed of artificial graphite, and these in turn are connected to metallic terminals $M^3$. Adjacent to these terminals are insulator rings $M^4$ which are connected to upper and lower heads $M^5$ mounted on an outer housing $M^6$. The mounting is formed by posts $M^7$ projecting from opposite ends of the housing $M^6$, and the upper head $M^5$ slidably engages its posts and is under the resilient pressure of springs $M^8$. The tension of these springs may be adjusted by thumb screws $M^9$ so as to maintain sufficient pressure between the parts for good electrical conduction from the terminals $M^3$ to the resistor M'. Within the casing $M^6$ is a refractory lining $M^{10}$ surrounding the resistor but spaced therefrom. Another heat insulating material $M^{11}$ is arranged between the lining $M^{10}$ and the casing $M^6$. The upper end of the chamber within the tubular bushing M' is closed by an insulator cap $M^{12}$, which forms a bushing surrounding the rod G. This will prevent an upward draft of air through the heated chamber and will thus maintain a more uniform temperature. There is also an insulator cap $M^{13}$ at the upper end of the casing surrounding the resistor and closing the chamber between said resistor and the lining $M^{10}$. The metallic terminals $M^3$ are preferably cooled by a fluid circulating medium passing throuugh annular channels in said terminals and connected with external conduits $M^{14}$.

The heater or furnace M just described has its casing $M^6$ slidably mounted on the columns B and is counterbalanced by means of flexible connections N passing over sheaves N' and connected to a counterweight $N^2$. The height of the columns B is sufficient so that the heater may be raised to entirely clear the abutments when a sample to be tested is to be placed therebetween. Stop collars B' are adjustable on the columns B and may be suitably positioned to limit the upward movement of the heater. The columns B are preferably maintained at uniform temperature by a liquid cooling medium circulated therethrough and passing through external conduits O at the upper and lower ends of said columns. The cooling of the columns B prevents the furnace heat from causing linear expansion or elongation of said columns, which would result in relative movement between the base A and the cross head C and would therefore cause the measurement of the linear expansion of the sample to be inaccurate. There is also preferably arranged a pan P mounted on the piston K above the post D, which serves to catch the sand of a sample tested to destruction. This will avoid danger of the sand getting into the hydraulic cylinder, and additional protection is afforded by a cap Q on the lower side of said pan having a depending flange surrounding the post.

With the construction as described in use, the heater M is first adjusted to its raised position and the sample to be tested is then placed between the exposed abutments F and G. These abutments are then pressed in contact with the end of the sample by hydraulic pressure due to the movement of the piston J in the cylinder I, which is operated by the turning of the screw J' through the handle $J^3$. It will be understood that due to the incompressibility of the liquid in the cylinder I, the abutment F when positioned as desired is substantially rigid, expansion of the sample under test therefore results in upward movement of the rod G producing a corresponding reading of the indicator H. A swivel connection $J^4$ between this screw and the piston will permit relative rotation so that the piston need not be turned in the cylinder. When the sample is properly positioned the heater M is lowered to surround the same and the electrical current is turned on to heat the resistor M' to the required temperature. For certain tests this heat is gradually applied, the heater being positioned around the sample prior to the turning on of the current. For other tests it is desirable to first turn on the current and bring the resistor to the required temperature before it is lowered to surround the sample, such tests simulating the shock which would occur in a mold when molten metal is first poured therein.

Where the test to be made is for expansion the reading is taken on the gauge H, which indicates the linear expansion of the sample as it is raised to a predetermined temperature. This is shown in Figure 2. If, on the other hand, the test is for the structural strength of the sample, the gauge H may be omitted and the abutment G' is connected at its upper end to the head C by a member $G^2$ and screw $G^3$, as shown in Figure 7. The piston J is then operated to increase the hydraulic pressure against the piston E, while the amount of pressure developed is indicated on the gauge K. Samples may be tested to destruction both when cold and when hot and the difference in pressure indications will tell the change in strength due to heating.

With the modified construction shown in Figure 6, instead of mounting the gauge H upon the cross head C it is connected to rods R which are attached to a plate R' between the sample and the lower abutment F. These rods pass upward through channels in the cap $M^{12}$ and head C and are secured to a gauge H' which is also operatively connected with the abutment rod G. With such construction the rods R and abutment rod G are subjected to the same temperature in the heated chamber so that any expansion in the one will be compensated for by a corresponding expansion in the other.

While I have only described a few of the tests that can be made with this instrument, it is obvious that it would be useful for many others which it is unnecessary to specifically mention.

What I claim as my invention is:

1. In a testing instrument of the character described, having a base, spaced columns, and an upper cross head; vertically spaced, relatively movable abutments between said base and said cross head for receiving therebetween a specimen to be tested, a tubular heater coaxial with said abutments; means on said heater slidably embracing said columns to guide said heater axially of said abutments; and counterweight means suspended from said cross head and operatively connected to said heater.

2. In a testing instrument of the character described, having a base, spaced columns, and an upper cross head; vertically spaced, relatively movable abutments between said base and said cross head for receiving therebetween a specimen to be tested, a tubular heater coaxial with said abutments; means on said heater slidably embracing said columns; said columns being hollow and having connections providing for the circulation of a cooling medium therethrough to prevent the heat from said heater from causing elongation of said columns.

3. In a testing instrument of the character described, a base, spaced columns extending vertically above said base, a cross bar connecting the upper ends of said columns, a vertical hydraulic cylinder in said base, a piston movable in said cylinder, means for forcing liquid into said cylinder to position said piston at a desired height, a lower abutment rod carried by said piston, an upper abutment rod co-axial with said lower rod, and adapted to contact a specimen positioned on said lower rod, an annular heating unit having parts guidingly engaging said columns and movable thereon, and a gauge on said cross bar engageable with said upper abutment rod to measure the linear expansion of the specimen when subjected to heat.

4. An instrument for measuring the linear expansion of a specimen, comprising a base, a cross head, spaced structural members interconnecting said base and said cross head, spaced abutments between said base and said cross head for receiving therebetween a specimen to be tested, a heater for heating the specimen, an indicator engageable with one of said abutments for measuring the linear expansion of the specimen, and a hollow column surrounding each of said structural members and forming a space therebetween, said columns having connections to provide for a circulation of a fluid medium within said hollow columns to cool the structural members and prevent expansion thereof due to heat from said heater.

5. A testing instrument of the character described comprising a base, spaced vertical columns on said base, a cross head connecting the upper ends of said columns, vertically spaced relatively movable abutments between said base and cross head for receiving therebetween a specimen to be tested, a cylinder in said base aligned with said abutments, a piston in said cylinder connected to one of said abutments, said other abutment being rigidly engaged with said cross head, means for forcing a fluid under pressure into said cylinder, a gauge for indicating the pressure of the fluid in said cylinder, a tubular heater coaxial with said abutments, means on said heater slidably engaging said columns to guide said heater axially of said abutments, and counterweight means suspended from said cross head and operatively connected to said heater.

6. A testing instrument of the character described comprising a base, spaced vertical columns on said base, a cross head connecting the upper ends of said columns, vertically spaced relatively movable abutments between said base and cross head for receiving therebetween a specimen to be tested, a tubular heater coaxial with said abutments, means on said heater slidably engaging said columns to guide said heater axially of said abutments, counterweight means suspended from said cross head and operatively connected to said heater, means for supporting the lowermost of said abutments substantially rigidly from said base, an indicator located above said cross head engaging the upper end of the uppermost of said abutments, and supporting means for said indicator mounted on the upper end of said lowermost abutment, whereby said supporting means and said upper abutment are subjected to substantially similar temperature conditions.

7. A testing instrument of the character described comprising a base, spaced vertical columns on said base, a cross head connecting the upper ends of said columns, vertically spaced relatively movable abutments between said base and cross head for receiving therebetween a specimen to be tested, means for supporting the lowermost of said abutments substantially rigidly from said base, the uppermost of said abutments extending above said cross head, an indicator carried by said cross head engageable with said uppermost abutment, a tubular heater coaxial with said abutments, means on said heater slidably embracing said columns for guiding said heater axially of said abutments, said columns having passages formed therein and connections to said passages to provide for the circulation of a cooling medium therein to prevent the heat from said heater from causing elongation of said columns.

8. A testing instrument comprising a base, spaced columns carried by said base, a cross head connecting said columns adjacent their upper ends, a vertically arranged hydraulic cylinder in said base, a piston in said cylinder, a lower abutment carried by and movable as a unit with said piston, means for applying liquid under pressure to said cylinder to adjust the height of said lower abutment and to retain said lower abutment substantially fixed in adjusted position, or to apply disrupting pressure to a specimen on said abutment, an upper abutment aligned with said lower abutment and adapted to engage the upper surface of a specimen located on said lower abutment, a cylindrical heater mounted for vertically guided movement on said columns and arranged coaxially of said abutments, said cross head adapted to serve as a rigid stop for said upper abutment when disrupting pressure is applied to said specimen, or to serve as a datum plane for gauging elongation of said specimen when the said lower abutment is maintained stationary and the specimen is heated by said heater.

9. A testing instrument of the character described having a base, spaced upright columns on said base, a cross head spanning the space between and connected to said columns at their upper ends, a hydraulic cylinder carried by the base, a piston in said cylinder, vertically spaced relatively movable abutments for receiving therebetween a specimen to be tested, one of said abutments being carried by the piston, the other of said abutments being carried by the cross head, a heater for the specimen slidably mounted on the columns, and means carried by the cross head for indicating the linear movement of the second mentioned abutment when the specimen is subjected to heat from said heater.

10. A testing instrument of the character described having a base, spaced upright hollow columns on said base, a cross head spanning the space between and connected to said columns at their upper ends, a hydraulic cylinder carried by the base, a piston in said cylinder, vertically spaced relatively movable abutments for receiving therebetween a specimen to be tested, one of said abutments being carried by the piston, the other of said abutments being carried by the cross head, a heater for the specimen slidably mounted on the columns, means for maintaining the columns at substantially uniform temperature including means for circulating a cooling medium through said columns, and means for indicating the linear movement of the second mentioned abutment when the specimen is subjected to heat from said heater.

11. A testing instrument of the character described having a base, spaced upright columns on the base, a cross head spanning the space between and connected to said columns at their upper ends, a hydraulic cylinder carried by the base, a piston in said cylinder, vertically spaced relatively movable abutments for receiving therebetween a specimen to be tested, one of said abutments being carried by the piston, the other of said abutments being carried by the cross head, a counterbalanced heater for the specimen slidably mounted on the columns, and means for indicating the linear movement of the second mentioned abutment when the specimen is subjected to heat from said heater.

HARRY W. DIETERT.